United States Patent Office 2,923,872
Patented Feb. 2, 1960

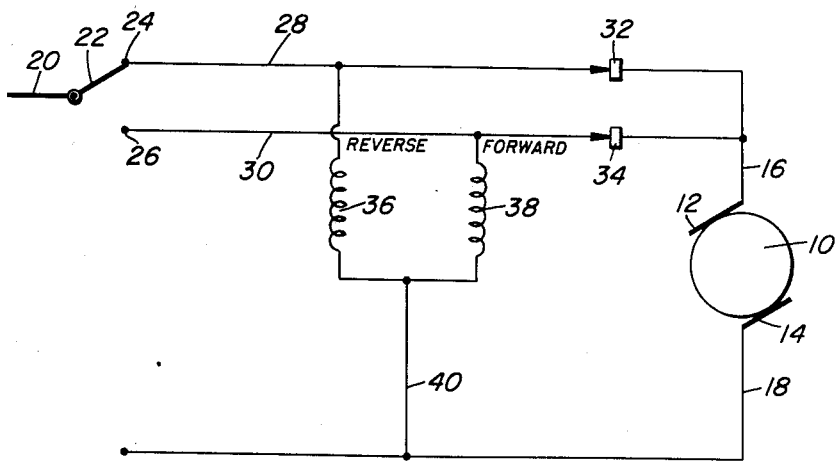

2,923,872
THREE WIRE REVERSIBLE FIELD SHUNT MOTOR

Ralph Herzog, Trail, Oreg.

Application April 5, 1956, Serial No. 576,349

2 Claims. (Cl. 318—297)

This invention relates to electric motors and more particularly to a three wire reversible field shunt motor.

The primary object of the present invention resides in the provision of an electric motor having the speed regulating characteristics of a shunt motor and at the same time retaining the switch arrangements that are used in split series field type motors.

A further object of the invention resides in the provision of a reversible field shunt motor especially adapted for use with aircraft actuators, servo mechanisms and other similar applications.

The construction of this invention features the use of rectifiers or other means of limiting the flow of current in one direction to permit current to flow at all times in the same direction through the armature while permitting current to flow in the proper shunt field coil to obtain the desired direction of rotation. Of course, a suitable switching arrangement is provided similar to the type of switching arrangement provided for controlling direction of rotation of a split series field type motor.

These, together with other ancillary objects and features of the invention which will become apparent as the following description proceeds, are attained by this three wire reversible field shunt motor, further embodiments of which have been illustrated in the accompanying drawing by way of example only, wherein:

Figure 1 is a schematic wiring diagram of an embodiment of the invention; and

Figure 2 is a schematic wiring diagram of the three wire reversible field shunt motor employing a braking coil.

With continuing reference to the accompanying drawing wherein like reference numerals designate similar parts throughout the various views, reference numeral 10 generally designates the armature of an electric motor having brushes 12 and 14 to which conductors 16 and 18 are connected. The conductor 18 is connected to one terminal of a suitable source of electrical power having a conductor as at 20 connected to the other terminal thereof. Connected to the terminal 20 is a switch 22 controlling flow of electric current to the terminals 24 and 26 and hence to conductors 28 and 30.

Suitable rectifiers such as those of silicon or selenium which are indicated at 32 and 34 are connected in series connection in the conductors 28 and 30 with the conductor 16. The rectifiers 32 and 34 are of opposite polarity with respect to each other.

A shunt field winding 36 wound for clockwise rotation is connected between conductors 28 and 18. A second shunt field winding 38 wound for counter-clockwise rotation is connected between conductors 30 and 18. A common conductor 40 is employed for connection of the coils 36 and 38 to the conductor 18.

In operation, with the switch in the position as is shown in Figure 1, clockwise rotation of the armature 10 and hence of the drive provided by this three wire reversible shunt field motor is achieved. However, upon movement of the switch 22 into engagement with the contact 26, polarity is reversed in the field thus reversing the direction of the armature 10 to a counter-clockwise motion.

In Figure 2 there is shown a modified form of the invention which in lieu of the common conductor 40 applies a brake coil 42. Obviously, there are other positions in the circuit where the brake coil 42 may be connected but it has been found that the brake coil should be placed as shown to minimize the amount of copper required and to hold the current that flows through the rectifiers 32 and 34 to a minimum.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A reversible field shunt drive comprising an electric motor having an armature, a pair of shunt field exciting windings, said windings wound in a manner to excite the motor in opposite directions, a pair of rectifiers, each of said rectifiers connected in series with said armature, each of said windings connected in parallel with one of said series rectifier-armature combinations, a source of electrical energy, a single pole double throw switch, the pole of said switch being electrically connected to one side of said source and adapted to selectively energize one of said windings.

2. The combination of claim 1 wherein a brake coil is connected in series with said pair of windings.

References Cited in the file of this patent

UNITED STATES PATENTS

| 2,515,480 | Webb | July 18, 1950 |
| 2,632,141 | Rabinow | Mar. 17, 1953 |
| 2,724,796 | Posselt et al. | Nov. 22, 1955 |
| 2,727,200 | Du Rocher | Dec. 13, 1955 |

FOREIGN PATENTS

| 577,730 | Great Britain | May 29, 1946 |